United States Patent
Wesström

(10) Patent No.: US 6,665,474 B2
(45) Date of Patent: Dec. 16, 2003

(54) METHOD OF IMPROVING SELECTIVITY IN A TUNABLE WAVEGUIDE FILTER

(75) Inventor: Jan-Olof Wesström, Stockholm (SE)

(73) Assignee: Altitun AB, Jarfalla (SE)

( * ) Notice: Subject to any disclaimer, the term of this patent is extended or adjusted under 35 U.S.C. 154(b) by 0 days.

(21) Appl. No.: 10/080,491

(22) Filed: Feb. 22, 2002

(65) Prior Publication Data

US 2002/0113670 A1 Aug. 22, 2002

(30) Foreign Application Priority Data

Feb. 22, 2001 (SE) .............................. 0100610

(51) Int. Cl.$^7$ ................................. G02B 6/26
(52) U.S. Cl. .................... 385/40; 385/41; 385/9; 385/8
(58) Field of Search ............... 385/2, 3, 8–10, 385/27, 39–42, 50, 51

(56) References Cited

U.S. PATENT DOCUMENTS

| | | | | |
|---|---|---|---|---|
| 4,923,264 A | * | 5/1990 | Langer et al. ................. | 385/2 |
| 5,022,730 A | | 6/1991 | Cimini et al. | |
| 5,131,060 A | * | 7/1992 | Sakata ............................ | 385/2 |
| 5,140,149 A | * | 8/1992 | Sakata et al. ................. | 257/436 |
| 5,333,216 A | | 7/1994 | Sakata et al. | |
| 5,416,866 A | | 5/1995 | Sahlen | |
| 5,559,912 A | | 9/1996 | Agahi et al. | |
| 5,613,020 A | * | 3/1997 | Uchida et al. ................. | 385/9 |
| 5,937,129 A | | 8/1999 | Jeong et al. | |
| RE36,710 E | | 5/2000 | Baets et al. | |
| 6,101,302 A | * | 8/2000 | Park et al. ..................... | 385/37 |
| 6,198,863 B1 | | 3/2001 | Lealman et al. | |

FOREIGN PATENT DOCUMENTS

| | | | |
|---|---|---|---|
| EP | 0 314 490 | 5/1989 | |
| EP | 0 386 797 | 9/1990 | |
| EP | 0 466 082 A2 | 1/1992 | |
| EP | 0 926 787 A1 | 6/1999 | |
| JP | 05188412 A | * 7/1993 | ............. G02F/1/35 |
| WO | WO 99/66664 | 12/1999 | |

OTHER PUBLICATIONS

Öberg et al., "74 nm Wavelength Tuning Range of an InGaAsP/InP Vertical Grating Assisted Codirectional Coupler Laser with Rear Sampled Grating Reflector", *IEEE Photonics Technology Letters*, Jul. 1993, vol. 5, No. 7, pp. 735–738, XP002199007, ISSN: 1041–1135.

Alferness et al, "Broadly tunable InGaAsP/InP buried rib waveguide vertical coupler filter", *Applied Physics Letter*, American Institute of Physics, New York, US, Feb. 24, 1992, vol. 60, No. 8, pp 980–982, XP000292179, ISSN: 0003–6951.

Alferness et al. "Broadly tunable InGaAsP/InP laser based on a vertical coupler filter with 57–nm tuning range", *Applied Physics Letter*, American Institute of Physics, New York, US, Jun. 29, 1992, vol 60, No. 26, pp 3209–3211, XP000281257, ISSN: 0003–6951.

International Search Report for PCT/IB02/00536.
International Search Report for PCT/IB02/00535.

* cited by examiner

*Primary Examiner*—Hemang Sanghavi
*Assistant Examiner*—Scott Knauss
(74) *Attorney, Agent, or Firm*—Altera Law Group, LLC

(57) ABSTRACT

A tunable waveguide filter, formed from two waveguides, has an improved selectivity. The filter is tuned by passing a current through the filter. One of the waveguides is a semi-active waveguide. The increased absorption of charge carriers that occurs when current is injected into the semi-active waveguide is compensated by gain enhancement in the waveguide, because the material used for the semi-active waveguide is selected to provide an appropriate amount of gain. Therefore, the gain compensates for the losses that arise from free carrier absorption when the tuning current is applied to the filter.

11 Claims, 3 Drawing Sheets

METHOD OF IMPROVING SELECTIVITY IN A TUNABLE WAVEGUIDE FILTER

This application claims priority from Swedish patent application 0100610-5, filed on Feb. 22, 2001, which is incorporated herein by reference.

FIELD OF THE INVENTION

The present invention relates to a method of improving selectivity in a tuneable waveguide filter in co-action with a laser.

BACKGROUND

Waveguide filters, also referred to as directional couplers, are formed from two adjacent waveguides and can be used as transmission filters. A problem with such filters arises when one waveguide suffers more losses than the other. In addition to a decrease in peak transmission, the transmission spectrum becomes broader and the transmission minima on either side of the transmission peak increase in transmission. This is disadvantageous, since the selectivity of the filter is reduced. In other words, the ability of the filter to transmit optical power at the desired wavelength is reduced while, at the same time, the transmission through the filter of optical power at undesired wavelengths is increased.

The shape of the transmission curve of a directional coupler is important with regard to its optical selectivity, i.e. the difference in transmission of two frequencies that are spaced a given distance apart. It may be beneficial for the transmission spectrum to fall to a zero value for frequencies on either side of the desired frequency, so that the transmission is fully extinguished by the filter with respect to certain frequencies. This is made impossible in a directional coupler when the optical absorption in the two waveguides is different.

A directional coupler is conveniently tuned by injecting charge carriers into one of the two waveguides. In addition to tuning, however, the charge carriers increase the optical losses due to free charge carrier absorption. The selectivity of the filter, therefore, is not uniform for the different frequencies over the filter's tuning range.

SUMMARY OF THE INVENTION

This problem is addressed by the present invention, which relates to a an approach to improve the selectivity in a tunable waveguide filter, such as a layered coupling filter, that includes two waveguides, also referred to as a directional coupler filter. One of the waveguides is a semi-active waveguide. The increased absorption of charge carriers that occurs when current is injected into the semi-active waveguide is compensated by gain enhancement in the waveguide, because the material used for the semi-active waveguide is selected to provide an appropriate amount of gain.

One particular embodiment of the invention is directed to a method of improving selectivity in a tunable waveguide filter that includes first and second waveguides, the first waveguide being a semi-active waveguide. The method includes coupling light between the first and second waveguides and passing current through the first and second waveguides to tune a light frequency of maximum transmission through the filter. The light in the semi-active waveguide is amplified.

Another embodiment of the invention is directed to a tunable filter that has a first waveguide and a second waveguide proximate the first waveguide so that light couples between the first and second waveguides. The second waveguide is semi-active. A grating structure is disposed proximate at least one of the first and second waveguides to enhance coupling of light between the first and second waveguides.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
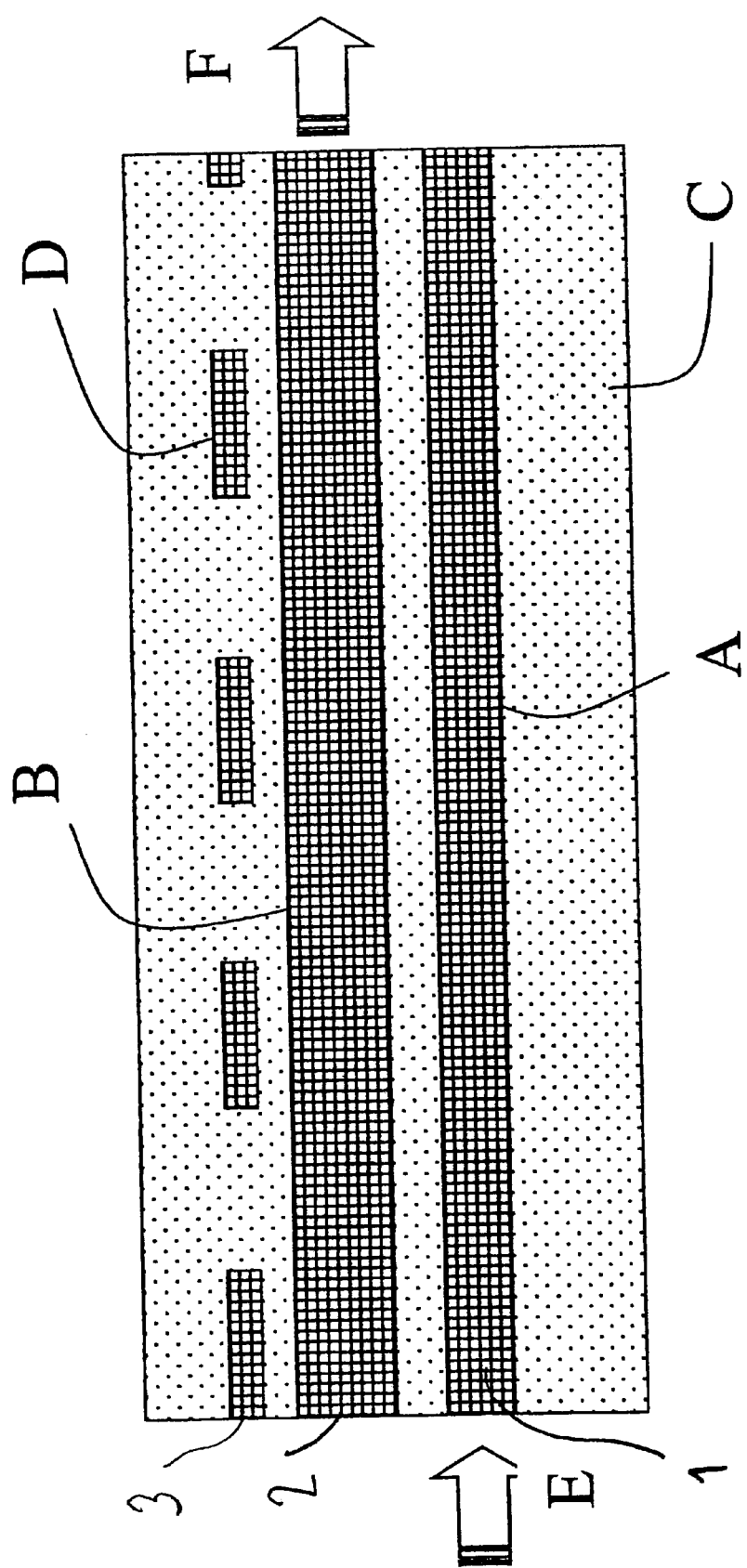
FIG. 1 is a schematic illustration of a directional coupler filter according to an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention relates to a method of improving selectivity in a tunable waveguide filter, such as a layered coupling filter, also referred to as a directional coupler filter. An embodiment of a directional coupler filter is schematically illustrated in FIG. 1, having two waveguides 1, 2. Although FIG. 1 shows a directional coupler filter, it will be understood that the invention may also be applied to other tunable filters.

In the present embodiment, light enters the filter at E, for instance, and is conducted first by the waveguide layer A of the first waveguide 1. Light at a given frequency is coupled to the waveguide layer B of the second waveguide 2. This transition of the light from the waveguide layer A to the waveguide layer B is dependent on a grating 3 that includes a grating layer D of a given periodicity. The waveguides 1, 2 and the grating 3 are surrounded by a material C. After being coupled from layer A to layer B, the light leaves the coupler at F. The coupling of light from the first waveguide 1 to the second waveguide 2 is wavelength dependent. The wavelength of peak transmission from E to F may be tuned to different wavelengths by injecting charge carriers into the waveguide layer B, for instance, so as to change the refractive index of the waveguide layer B.

According to the invention, one of the waveguides 1, 2 is a semi-active waveguide, and thus not only optically confines light propagating therethrough, but also provides gain. The semi-active waveguide 1, 2 is formed from a material that provides gain to counteract the free carrier losses when the tuning current passes through the semi-active waveguide 1,2. According to one particular embodiment of the invention, the increased optical absorption in the waveguide that arises from the presence of free carriers in the semi-active waveguide is compensated for by the gain in the semi-active waveguide 1, 2.

In an example, current may be injected into the coupler illustrated in FIG. 1, through both the first waveguide 1 and the second waveguide 2. Charge carriers are injected into the semi-active waveguide, because it forms a p-n junction.

Figure 3:
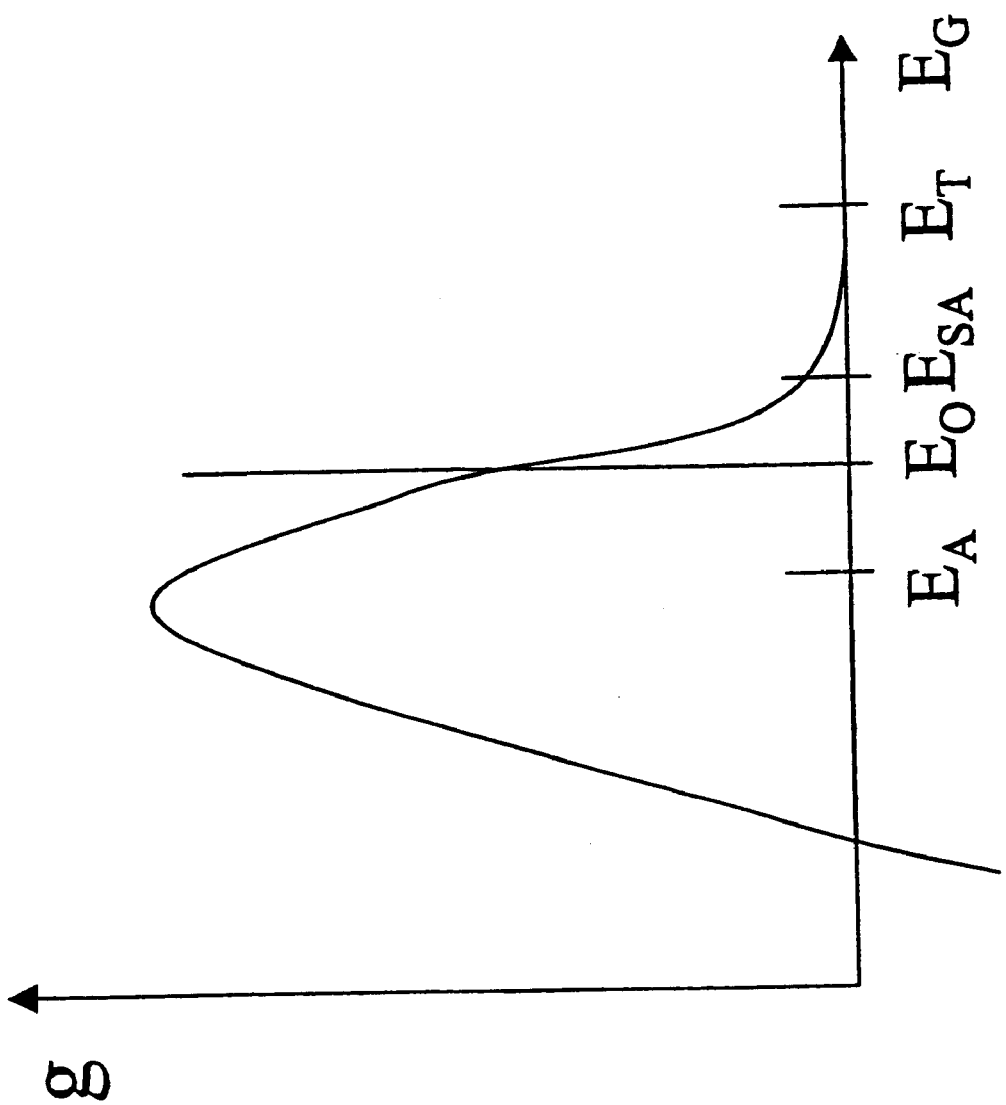
FIG. 3 presents a curve showing gain in a waveguide as a function of bandgap energy.

According to one particular embodiment of the invention, the semi-active waveguide 1, 2 has a bandgap energy that lies close to the photon energy of the light to be filtered. This is illustrated in the following discussion of FIG. 3, which schematically shows the gain, g, in an active waveguide as a function of bandgap energy $E_g$, for a constant charge carrier density. The gain is highest when the bandgap energy is lower than the prevailing optical photon energy $E_o$, such as $E_A$. Such a material is normally chosen for the gain section of a laser.

Charge carriers are consumed when gain takes place. This is undesirable in a tuning section, since the carrier density is reduced and the tuning effect is reduced. Consequently, the bandgap energy of a coupler waveguide is selected to be significantly higher than the prevailing photon energy, $E_T$, and so the gain in the waveguide, it any, is negligible.

When applying the invention in a semi-active coupler filter, however, the waveguide material is selected so that the bandgap energy $E_{SA}$ lies just above the prevailing photon energy. As a result, optical gain by stimulated emission takes place to a certain extent for the prevailing frequency with photon energy $E_o$ where charge carriers are present in the material. Such a material enables injected charge carriers to cause both optical gain and tuning. The bandgap energy $E_{SA}$ may be chosen so that, when charge carriers are injected, the gain essentially compensates for the optical losses arising from carrier absorption that inevitably occur inevitably when charge carriers are injected.

When the filter is intended to operate at a wavelength of about 1.55 µm, a wavelength commonly used for optical communications, the surrounding material C may be InP. In this case, $In_{(1-x)}Ga_xAsP_{(1-y)}$, which is lattice-matched to InP, is chosen as the material for the two waveguides 1, 2 and the grating 3. The two waveguides 1, 2 typically have different materials, in other words different values for X and Y, so that one waveguide is semi-active, while the other waveguide is not semi-active.

The peak photoluminescence wavelength in the semi-active waveguide may, for instance, be chosen as λ=1.48 µm so as to obtain sufficient gain to compensate for the free carrier loss. Such a photoluminescence wavelength and grating constant corresponds to X=0.386 and Y=0.832 in the aforesaid formula for the semi-active waveguide. Thus, according to one particular embodiment, X is approximately equal to 40% and Y is approximately equal to 80%.

Figure 2:
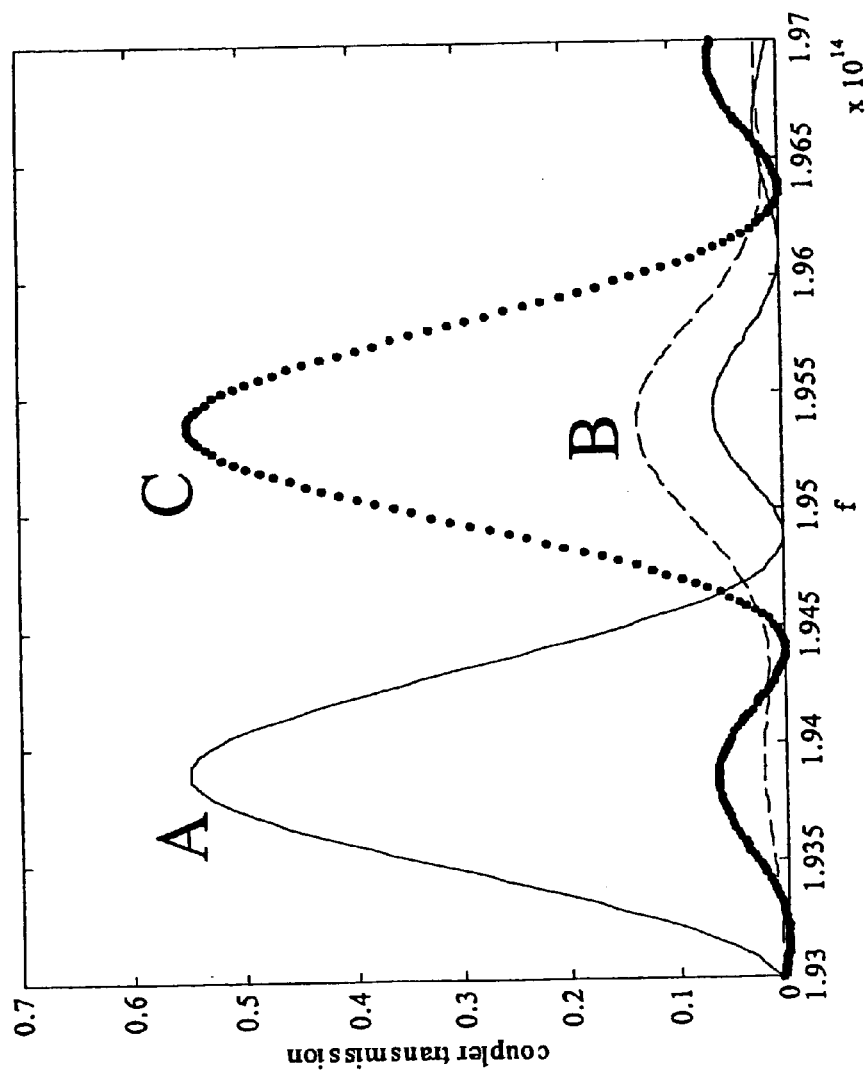
FIG. 2 shows transmission curves of a directional coupler filter as a function of frequency.

Transmission curves for a directional coupler filter are presented in FIG. 2, as a function of frequency f. Curve A shows the transmission spectrum of a coupling structure formed from upper and lower waveguides, each having a loss of 3 cm$^{-1}$. The coupler is designed to extinguish the transmission of light at 1 THz from the peak transmission. Accordingly, the peak transmission of about 0.54 occurs at about 193.9 THz, while the first transmission minimum from the peak has a transmission value of zero at about 194.9 THz. The transmission has a full-width, half-maximum value of about 0.91 THz.

Curve B illustrates the transmission of the same coupler that has been tuned to a higher frequency, about 195.3 THz. In this case, the injected charge carriers cause losses in the upper waveguide 2 of 20 cm$^{-1}$. This impairs the selectivity of the coupler. The peak transmission of the coupler is reduced to about 0.13. The transmission spectrum no longer manifests zero points at the first minima spaced from the peak transmission frequency. The transmission of a frequency 1 THz different from the frequency of peak transmission has risen to about 12% of the peak transmission. Moreover, the transmission spectrum has a full-width, half-maximum value of about 1.04 THz.

Curve C illustrates the transmission through a directional coupler filter when the upper waveguide 2 is formed as a semi-active waveguide. In this case, the gain in the semi-active waveguide compensates for the increased free carrier losses. The transmission spectrum is similar to that for the untuned case, curve A. The transmission falls to zero at the first minima from the peak transmission, and the full-width, half-maximum value is about 0.91 THz. Thus, the coupler is able to retain its transmission characteristics over the tuning range since the losses in the waveguides may be maintained constant over a range of tuning currents.

As noted above, the present invention is applicable to waveguide couplers and is believed to be particularly useful for maintaining uniform tuning selectivity over a wide wavelength range. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

The claimed invention is:

1. A method of improving selectivity in a tunable waveguide filter that includes first and second waveguides, the first waveguide being a semi-active waveguide, the method comprising:

coupling light between the first and second waveguides;

passing current through the first and second waveguides to tune a light frequency of maximum transmission through the filter; and amplifying the light in the semi-active waveguide;

wherein the semi-active waveguide has a bandgap energy close to the photon energy of the light coupled between the first and second waveguides.

2. A method as recited in claim 1, wherein optical gain in the semi-active waveguide substantially compensates for losses arising from the current passing through the semi-active waveguide.

3. A method as recited in claim 1, wherein the bandgap energy is greater than the photon energy.

4. A method as recited in claim 1, wherein the semi-active waveguide is formed from $In_{(1-x)}Ga_xAsP_{(1-y)}$.

5. A method as recited in claim 4, wherein X has a value of approximately 40% and Y has a value of approximately 80%.

6. A tunable filter comprising, a first waveguide;

a second waveguide proximate the first waveguide so that light couples between the first and second waveguides, the second waveguide being semi-active; and a grating structure disposed proximate at least one of the first and second waveguides to enhance coupling of light between the first and second waveguides;

wherein the semi-active waveguide has a bandgap energy close to the photon energy of the light coupled between the two waveguides.

7. A filter as recited in claim 6, wherein optical gain in the semi-active waveguide substantially compensates for filter losses arising from a tuning current passing through the semi-active waveguide.

8. A filter as recited in claim 6, wherein the bandgap energy is greater than the photon energy.

9. A filter as recited in claim 6, wherein the semi-active waveguide is formed from $In_{(1-x)}Ga_xAsP_{(1-y)}$.

10. A filter as recited in claim 9, wherein X has a value of approximately 40% and Y has a value of approximately 80%.

11. A filter as recited in claim 6, wherein the filter has a first transmission spectrum associated with a first optical center frequency when no current passes through the filter and a second spectrum associated with a second optical center frequency when a tuning current passes through the filter.

* * * * *